(12) United States Patent
Shiraki

(10) Patent No.: US 11,665,228 B2
(45) Date of Patent: May 30, 2023

(54) MANAGEMENT DEVICE, STORAGE SYSTEM, AND INFORMATION PROCESSING METHOD

(71) Applicant: FUJITSU LIMITED, Kawasaki (JP)

(72) Inventor: Osamu Shiraki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/686,022

(22) Filed: Mar. 3, 2022

(65) Prior Publication Data

US 2022/0394086 A1    Dec. 8, 2022

(30) Foreign Application Priority Data

Jun. 7, 2021    (JP) ............................ JP2021-095239

(51) Int. Cl.
    *H04L 67/1008*    (2022.01)
    *H04L 67/1097*    (2022.01)
    *H04L 67/1031*    (2022.01)
    *H04L 67/1012*    (2022.01)

(52) U.S. Cl.
    CPC ...... *H04L 67/1008* (2013.01); *H04L 67/1012* (2013.01); *H04L 67/1031* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 8,046,446 | B1* | 10/2011 | Karr | H04L 67/1097 709/223 |
| 9,218,214 | B2* | 12/2015 | Takemura | G06F 9/505 |
| 9,703,504 | B2* | 7/2017 | Kuwayama | G06F 3/0632 |
| 10,768,850 | B2* | 9/2020 | Muniswamy-Reddy | G06F 11/1471 |
| 10,983,719 | B1* | 4/2021 | Williams | G06F 3/0604 |
| 11,288,132 | B1* | 3/2022 | Rajimwale | G06F 11/1469 |
| 2002/0116351 | A1* | 8/2002 | Skaanning | G06N 7/01 706/21 |
| 2006/0007942 | A1* | 1/2006 | Ogawa | H04L 67/1065 370/400 |
| 2006/0047813 | A1* | 3/2006 | Aggarwal | H04L 67/1001 709/226 |
| 2007/0192382 | A1* | 8/2007 | Harris | H04L 67/1001 |
| 2007/0283009 | A1* | 12/2007 | Takemura | H04L 43/08 709/224 |
| 2008/0271039 | A1* | 10/2008 | Rolia | G06Q 10/06 718/105 |
| 2011/0145631 | A1* | 6/2011 | Shankar | G06F 11/0709 714/E11.073 |

(Continued)

FOREIGN PATENT DOCUMENTS

JP      2016-528617 A    9/2016
WO    WO-2015/030900 A1    3/2015

*Primary Examiner* — Backhean Tiv
(74) *Attorney, Agent, or Firm* — ArentFox Schiff LLP

(57) ABSTRACT

A management device of a storage system, the management devices includes a memory and a processor. The processor coupled to the memory and configured to acquire workload load information and system load information when executing a container, and determine a workload arrangement destination and a replica position of a volume based on the workload load information and the system load information when activating a workload.

9 Claims, 13 Drawing Sheets

(56) References Cited

U.S. PATENT DOCUMENTS

| | | | | |
|---|---|---|---|---|
| 2012/0265741 | A1* | 10/2012 | Moon | G06F 9/5083 |
| | | | | 707/694 |
| 2012/0311600 | A1* | 12/2012 | Takemura | G06F 9/505 |
| | | | | 718/104 |
| 2014/0149784 | A1* | 5/2014 | Ngo | H04L 67/1008 |
| | | | | 714/4.11 |
| 2014/0297950 | A1* | 10/2014 | Kuwayama | G06F 3/0632 |
| | | | | 711/114 |
| 2015/0242289 | A1* | 8/2015 | Suzuki | G06F 11/3433 |
| | | | | 714/4.11 |
| 2017/0250925 | A1* | 8/2017 | Suzuki | H04L 43/0882 |
| 2018/0248949 | A1* | 8/2018 | Siddappa | H04L 67/1097 |
| 2019/0294473 | A1* | 9/2019 | Martin | H04L 43/0817 |
| 2019/0306022 | A1* | 10/2019 | Shimoga Manjunatha | ........ |
| | | | | H04L 41/0813 |
| 2020/0195665 | A1* | 6/2020 | Beddus | G06F 11/302 |
| 2021/0397485 | A1* | 12/2021 | Sakashita | G06F 9/5016 |

\* cited by examiner

FIG. 12

| STORAGE NODE | Slack | V$_1$ | V$_2$ | V$_3$ |
|---|---|---|---|---|
| | | R$_1$ | R$_2$ | R$_3$ |
| #1 | S$_1$ | R$_{11}$ | 0 | R$_{31}$ |
| #2 | S$_2$ | R$_{12}$ | R$_{22}$ | 0 |
| #3 | S$_3$ | 0 | R$_{23}$ | R$_{33}$ |

MANAGEMENT DEVICE, STORAGE SYSTEM, AND INFORMATION PROCESSING METHOD

CROSS-REFERENCE TO RELATED APPLICATION

This application is based upon and claims the benefit of priority of the prior Japanese Patent Application No. 2021-95239, filed on Jun. 7, 2021, the entire contents of which are incorporated herein by reference.

FIELD

The embodiment discussed herein is related to a management device, a storage system, and an information processing method.

BACKGROUND

A cluster system that has a storage via a network exists.

In the cluster system, a plurality of servers is prepared as a cluster connected with the network and applications share and use its hardware. As one form of a cluster configuration, there is a system in which a computational resource (CPU) is separated from a storage resource (storage). As an application execution form, low overhead containers have been adopted.

US Patent Publication No. 2018/0248949, US Patent Publication No. 2019/0306022, and Japanese National Publication of International Patent Application No. 2016-528617 are disclosed as related art.

SUMMARY

According to an aspect of the embodiments, an apparatus includes . . . A management device of a storage system, the management devices includes: a memory; and a processor coupled to the memory and configured to: acquire workload load information and system load information when executing a container, and determine a workload arrangement destination and a replica position of a volume based on the workload load information and the system load information when activating a workload.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a table for explaining a band target value in the processing for arranging the storage illustrated in FIG. 11.

DESCRIPTION OF EMBODIMENTS

US Patent Publication No. 2018/0248949, US Patent Publication No. 2019/0306022, and Japanese National Publication of International Patent Application No. 2016-528617 are disclosed as related art.

Figure 1:
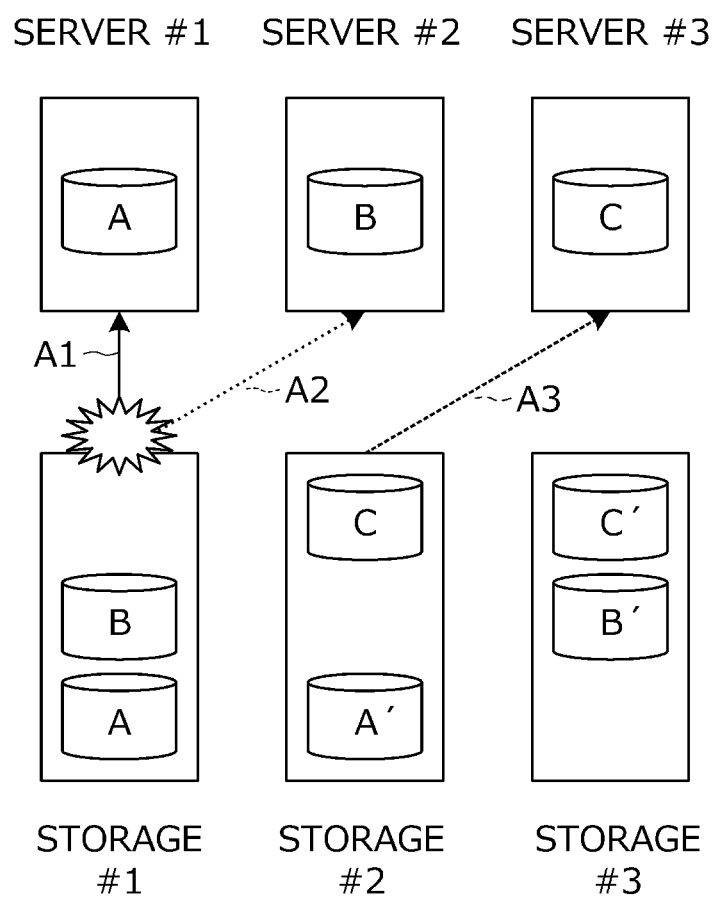
FIG. 1 is a diagram for explaining an example of reading data in a cluster system.

FIG. 1 is a diagram for explaining an example of reading data in a cluster system.

In the cluster system illustrated in FIG. 1, for each of data A and B stored in a storage #1 and data C stored in a storage #2, data A' as a replica is stored in the storage #2, and data B' and data C' as replicas are stored in a storage #3.

As indicated by a reference A1, a server #1 reads the data A from the storage #1. Furthermore, as indicated by a reference A2, a server #2 reads the data B from the storage #1. Moreover, as indicated by a reference A3, a server #3 reads the data C from the storage #2.

In this way, in a case where a workload is not controlled in the cluster system, the workloads are concentrated on a specific storage (storage #1 in the example illustrated in FIG. 1), and there is a possibility that throughput decreases.

In one aspect, an object is to distribute loads in a storage system so as to improve throughput.

[A] Embodiment

Hereinafter, an embodiment will be described with reference to the drawings. Note that the embodiment to be described below is merely an example, and there is no intention to exclude application of various modifications and techniques not explicitly described in the embodiment. In other words, for example, the present embodiment may be variously modified and implemented without departing from the scope of the gist thereof. Furthermore, each drawing is not intended to include only components illustrated in the drawings and may include another function and the like.

Hereinafter, each same reference code represents a similar part in the drawings, and thus description thereof will be omitted.

[A-1] Structure Example

Figure 2:
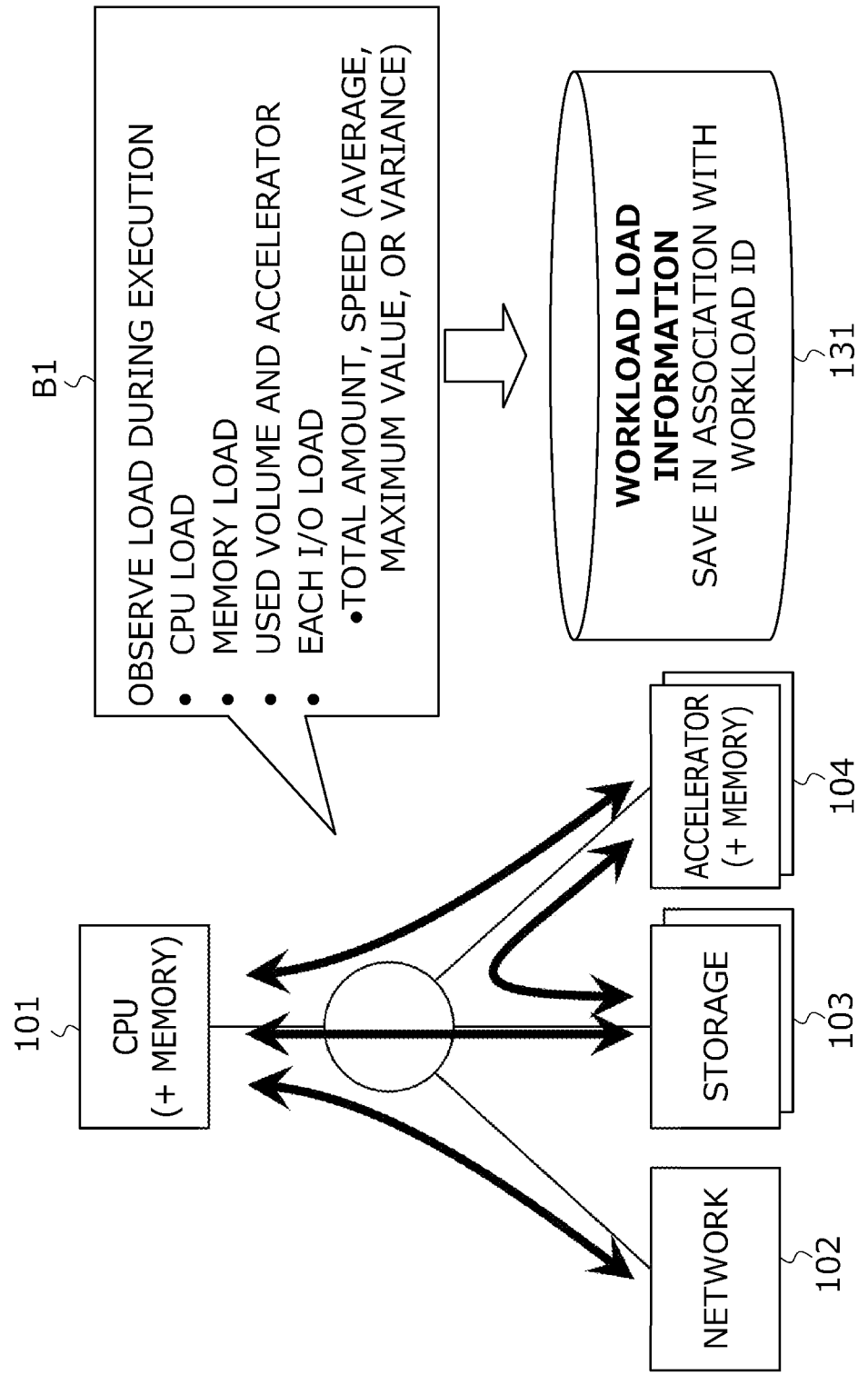
FIG. 2 is a block diagram for briefly explaining acquisition and accumulation of workload load information according to an embodiment.

FIG. 2 is a block diagram for briefly explaining acquisition and accumulation of workload load information according to the embodiment.

When a workload is executed, workload load information 131 is acquired and is saved in association with a workload ID. In other words, when a container is executed, a status of an access to a resource is acquired. Then, resource request information is accumulated in association with a container image.

As loads when the workload is executed, a CPU load, a memory load, a used volume and an accelerator load of a graphics processing unit (GPU) or the like, and an input/output (I/O) load are observed. The I/O load may be an average, a maximum value, or a variance of a total amount of data or a speed.

The I/O load may be acquired as being classified into an I/O load between a CPU 101 and a storage 103, an I/O load between the CPU 101 and a network 102, an I/O load between the CPU 101 and an accelerator 104, and an I/O load between the accelerator 104 and the storage 103.

The CPU 101 and the accelerator 104 may built a memory therein.

Figure 3:
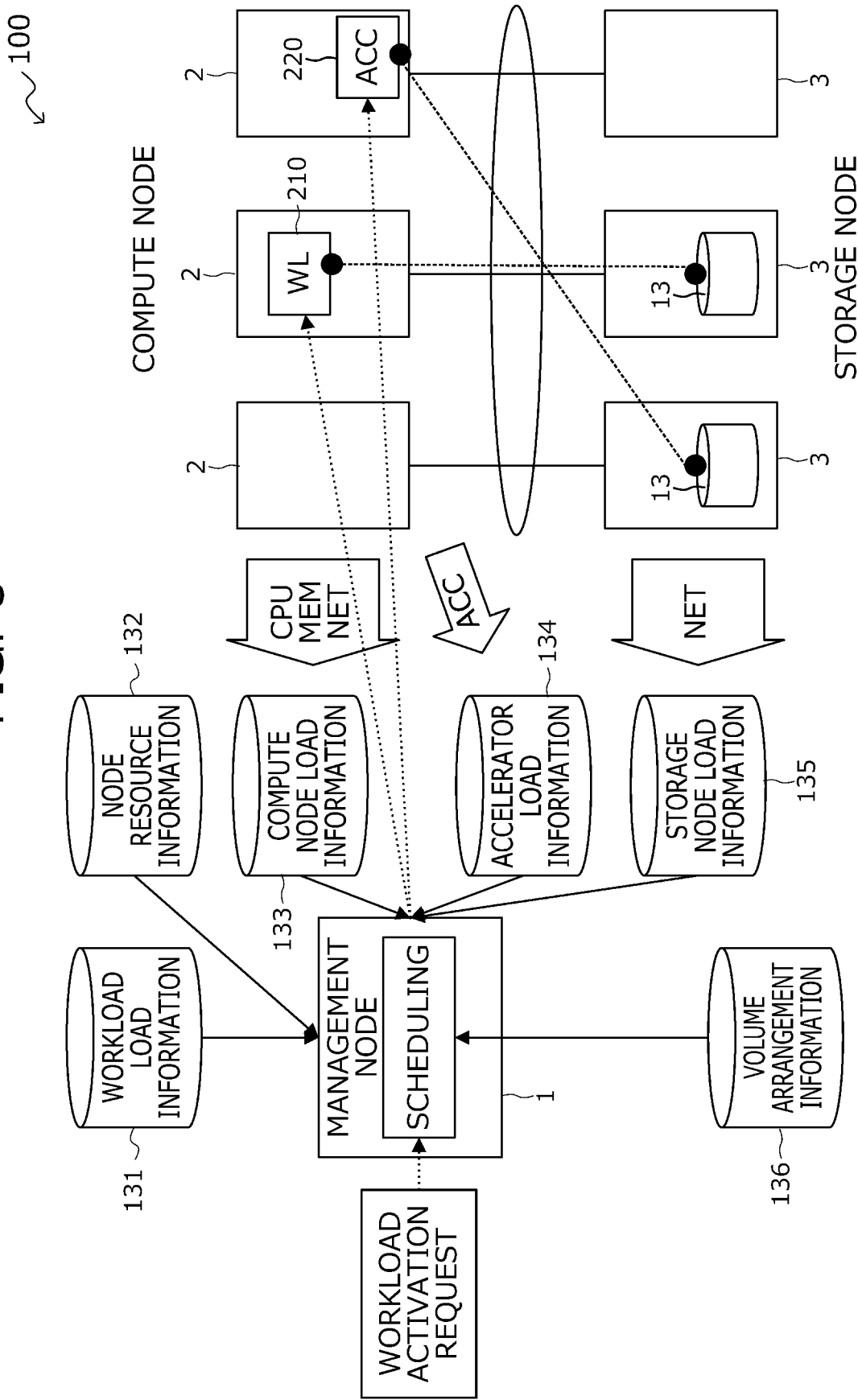
FIG. 3 is a block diagram for explaining a replica position determination operation in a storage system as the embodiment.

FIG. 3 is a block diagram for explaining a replica position determination operation in a storage system 100 as the embodiment.

The storage system 100 includes a management node 1, a plurality of (three in the illustrated example) compute nodes 2, and a plurality of (three in the illustrated example) storage nodes 3.

The management node 1 is an example of a management device. Upon receiving a workload execution request, the management node 1 collects the workload load information 131, node resource information 132, compute node load information 133, accelerator load information 134, storage node load information 135, and volume arrangement information 136. Then, the management node 1 schedules a workload (WL) 210 and an accelerator (ACC) 220 and determines arrangement of the workload 210 and a replica position of a used volume.

The workload load information 131 indicates a load caused by the workload 210 executed by the compute node 2.

The node resource information 132 is static information indicating how much the memories, the CPUs, the accelerators 220, or the like each node includes.

The compute node load information 133 indicates loads of a CPU, a memory (MEM), and a network (NET) in the compute node 2.

The accelerator load information 134 indicates a load of the accelerator 220 in the compute node 2.

The storage node load information 135 indicates a load of a disk 13 in the storage node 3.

The volume arrangement information 136 indicates which volume exists in each storage node 3.

In the management node 1, a scheduler 110 to be described later with reference to FIG. 4 grasps a resource usage status. At the time when the workload 210 (in other words, container) is activated, the compute node 2 (in other words, CPU node and accelerator node) and the storage node 3 are determined based on a load request and the resource usage status of the workload 210. The determination is made considering that increase in the I/O load does not exceed a network slack (in other words, margin) of an arrangement node, the selection of the storage node 3 is dynamically controlled according to a load status.

Figure 4:
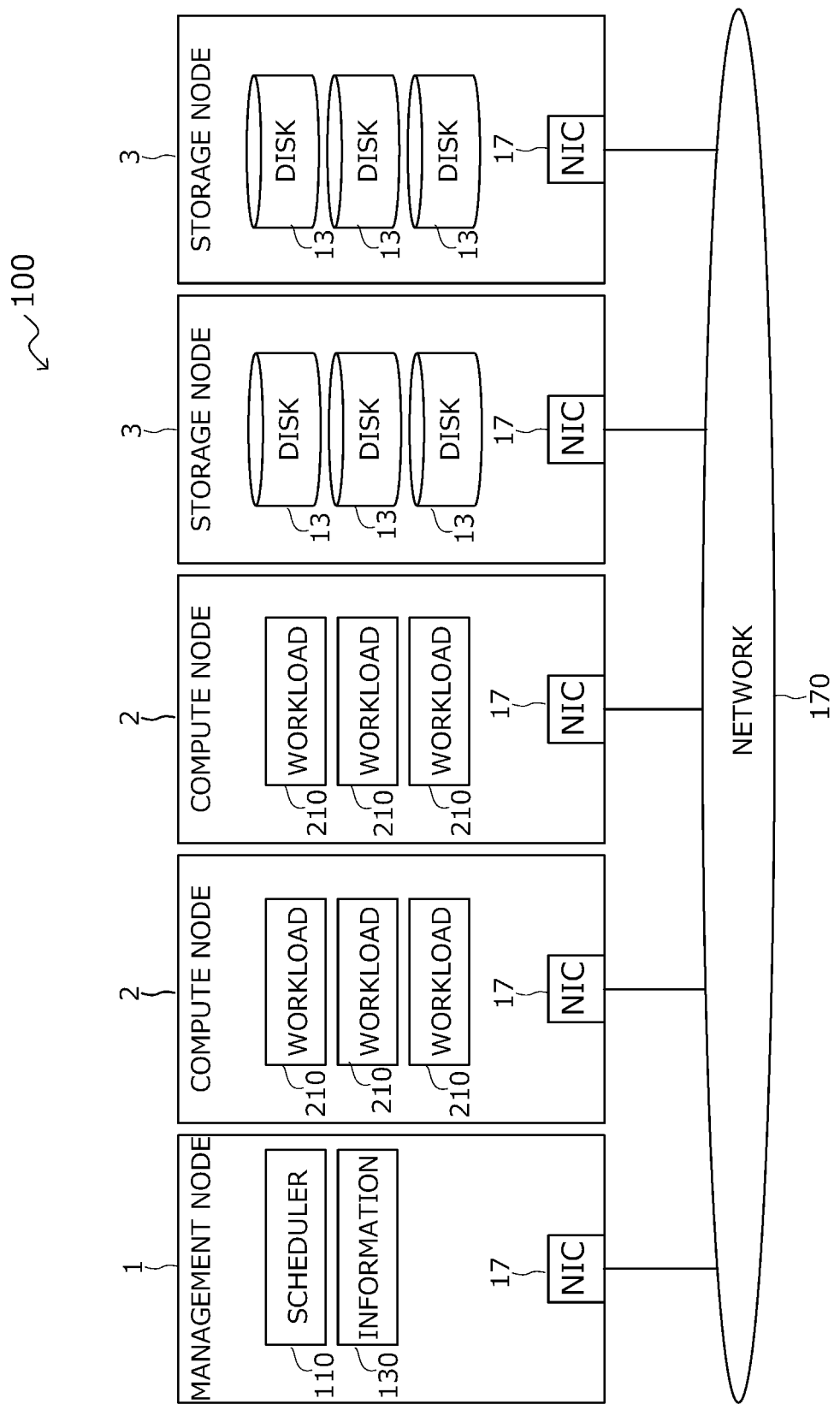
FIG. 4 is a block diagram schematically illustrating a structure example of the storage system illustrated in FIG. 3.

FIG. 4 is a block diagram schematically illustrating a structure example of the storage system 100 illustrated in FIG. 3.

The storage system 100 is, for example, a cluster system and includes the management node 1, the plurality of (two in the example illustrated in FIG. 4) compute nodes 2, and the plurality of (two in the example illustrated in FIG. 4) storage nodes 3. The management node 1, the plurality of compute nodes 2, and the plurality of storage nodes 3 are connected via a network 170.

The management node 1 is an example of a management device and includes the scheduler 110, information 130, and a network interface card (NIC) 17. The scheduler 110 determines arrangement of the workload 210 in the compute node 2 and the disk 13 in the storage node 3. The information 130 includes the workload load information 131, the node resource information 132, the compute node load information 133, the accelerator load information 134, the storage node load information 135, and the volume arrangement information 136 illustrated in FIG. 3. The NIC 17 connects the management node 1 to the network 170.

Each compute node 2 is an example of a server device and includes a plurality of (three in the example illustrated in FIG. 4) workloads 210 and the NIC 17. The workload 210 is arranged by the management node 1 and is executed to access data of the storage node 3. The NIC 17 connects the compute node 2 to the network 170.

Each storage node 3 is an example of a storage device and includes a plurality of (three in the example illustrated in FIG. 4) disks 13 and the NIC 17. The disk 13 is a storage device that stores data to be accessed from the compute node 2. The NIC 17 connects the storage node 3 to the network 170.

Figure 5:
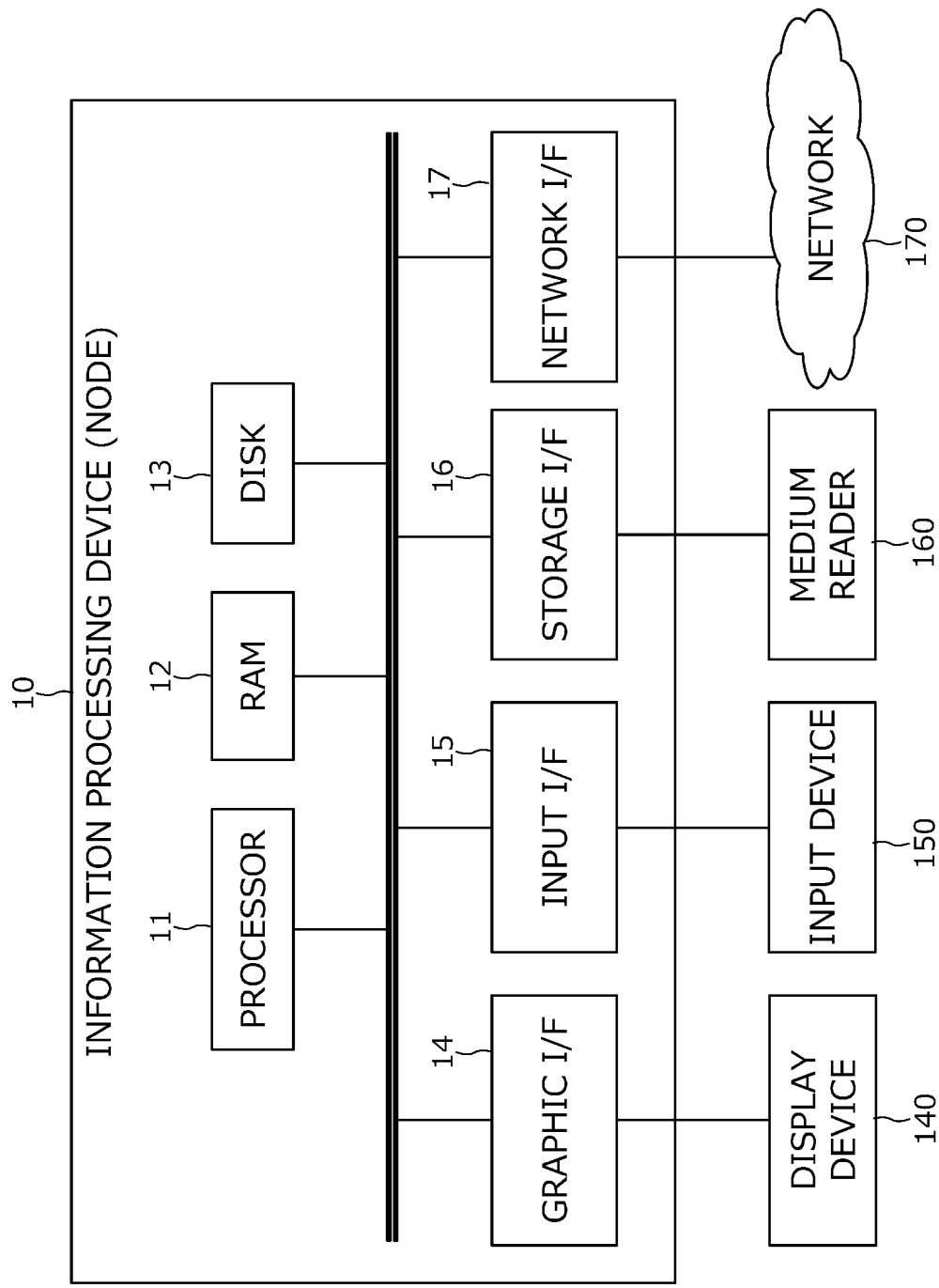
FIG. 5 is a block diagram schematically illustrating a hardware structure example of an information processing device as the embodiment.

FIG. 5 is a block diagram schematically illustrating a hardware structure example of an information processing device 10 as the embodiment.

The hardware structure example of the information processing device 10 illustrated in FIG. 5 indicates a hardware configuration example of each of the management node 1, the compute node 2, and the storage node 3 illustrated in FIG. 4.

The information processing device 10 includes a processor 11, a random access memory (RAM) 12, the disk 13, a graphic interface (I/F) 14, an input I/F 15, a storage I/F 16, and a network I/F 17.

The processor 11 is, for example, a processing device that performs various controls and calculations, and implements various functions by executing an operating system (OS) and programs stored in the RAM 12.

Note that, the program that implements the functions as the processor 11 may be provided in a form recorded in a computer-readable recording medium, for example, a flexible disk, a compact disc (CD) (CD-read only memory (ROM), CD-recordable (R), CD-rewritable (RW), or the like), a digital versatile disc (DVD) (DVD-ROM, DVD-RAM, DVD-R, DVD+R, DVD-RW, DVD+RW, high definition (HD) DVD, or the like), a Blu-ray disc, a magnetic disc, an optical disc, a magneto-optical disc, or the like. Then, a computer (the processor 11 in the present embodiment) may read the program from the recording medium described above via a reading device (not illustrated), transfer and store the read program in an internal recording device or an external recording device, and use the program. Furthermore, the program may also be recorded in a storage device (recording medium), for example, a magnetic disc, an optical disc, a magneto-optical disc, or the like, and may also be provided to the computer from the storage device via a communication path.

When the functions as the processor 11 are implemented, the programs stored in the internal storage device (the RAM 12 in the present embodiment) can be executed by the computer (the processor 11 in the present embodiment).

Furthermore, the computer may also read and execute the program recorded in the recording medium.

The processor 11 controls the entire information processing device 10. The processor 11 may also be a multiprocessor. The processor 11 may also be, for example, any one of a central processing unit (CPU), a micro processing unit (MPU), a digital signal processor (DSP), an application specific integrated circuit (ASIC), a programmable logic device (PLD), and a field programmable gate array (FPGA). Furthermore, the processor 11 may also be a combination of two or more types of elements of the CPU, MPU, DSP, ASIC, PLD, and FPGA.

The RAM 12 may be, for example, a dynamic RAM (DRAM). A software program of the RAM 12 may be appropriately read and executed by the processor 11. Furthermore, the RAM 12 may be used as a primary recording memory or a working memory.

The disk 13 is, for example, a device that stores data in a readable and writable manner, and, for example, a hard disk drive (HDD), a solid state drive (SSD), and a storage class memory (SCM) may be used.

The graphic I/F 14 outputs a video to a display device 140. The display device 140 is a liquid crystal display, an organic light-emitting diode (OLED) display, a cathode ray tube (CRT), an electronic paper display, or the like, and displays various types of information for an operator or the like.

The input I/F 15 receives an input of data from an input device 150. The input device 150 is, for example, a mouse, a trackball, and a keyboard, and the operator performs various input operations via the input device 150. The input device 150 and the display device 140 may also be combined and may also be, for example, a touch panel.

The storage I/F 16 inputs and outputs data to a medium reader 160. The medium reader 160 is configured so that a recording medium can be attached thereto. The medium reader 160 is configured to be able to read information recorded in the recording medium in a state where the recording medium is attached. In this example, the recording medium is portable. For example, the recording medium is a flexible disc, an optical disc, a magnetic disc, a magneto-optical disc, a semiconductor memory, or the like.

The network I/F 17 is an interface device that connects the information processing device 10 to the network 170 and communicates with another information processing device 10 (in other words, management node 1, compute node 2, or storage node 3) and an external device (not illustrated) via the network 170. As the network I/F 17, various interface cards complying with the standards of the network 170, for example, a wired local area network (LAN), a wireless LAN, a wireless wide area network (WWAN) can be used.

Figure 6:
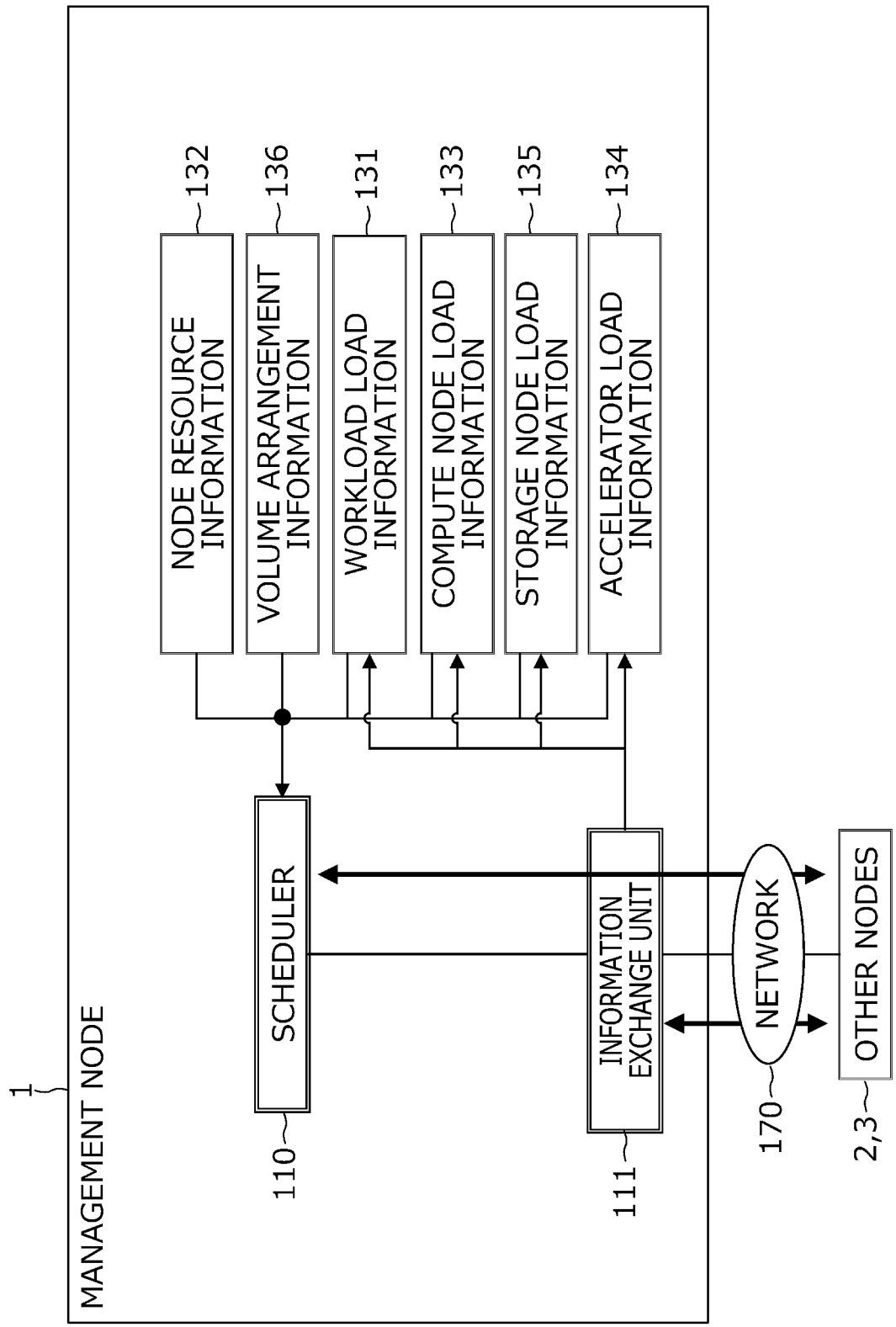
FIG. 6 is a block diagram schematically illustrating a software structure example of a management node illustrated in FIG. 3.

FIG. 6 is a block diagram schematically illustrating a software structure example of the management node 1 illustrated in FIG. 3.

The management node 1 functions as the scheduler 110 and an information exchange unit 111.

The information exchange unit 111 acquires the workload load information 131, the compute node load information 133, the storage node load information 135, and the accelerator load information 134 from another node (in other words, compute node 2 and storage node 3) via the network 170.

In other words, when executing the container, the information exchange unit 111 acquires the workload load information 131 and system load information (in other words, compute node load information 133, accelerator load information 134, and storage node load information 135).

The scheduler 110 determines the arrangement of the workload 210 on the basis of the workload load information 131, the compute node load information 133, the storage node load information 135, and the accelerator load information 134 acquired by the information exchange unit 111, in addition to the node resource information 132 and the volume arrangement information 136.

In other words, when the workload 210 is activated, the scheduler 110 determines an arrangement destination of the workload 210 and the replica position of the volume on the basis of the workload load information 131 and the system load information.

The scheduler 110 may select a first compute node 2 of which a sum of a communication amount between the processor 11 and the network 170, a communication amount between the processor 11 and the volume, and a communication amount between the accelerator 220 and the volume is equal to or less than a margin in the network 170 from among the plurality of compute nodes 2. Furthermore, the scheduler 110 may select a second compute node 2 of which a sum of the communication amount between the processor 11 and the network 170, the communication amount between the processor 11 and the volume, and a communication amount between the processor 11 and the accelerator 220 is equal to or less than the margin in the network 170 from among the plurality of compute nodes 2. Then, the scheduler 110 may determine the first compute node 2 or the second compute node 2 as the arrangement destination of the workload 210.

The scheduler 110 may select one or more first storage nodes 3 of which a sum of the communication amount between the processor 11 and the volume and the communication amount between the accelerator 220 and the volume is equal to or less than the margin in the network 170 from among the plurality of storage nodes 3. Then, the scheduler 110 may determine the one or more first storage nodes 3 as the replica positions.

In a case where a difference between the loads of the plurality of storage nodes 3 included in the storage system 100 exceeds a threshold, the scheduler 110 may also determine the replica position.

Figure 7:
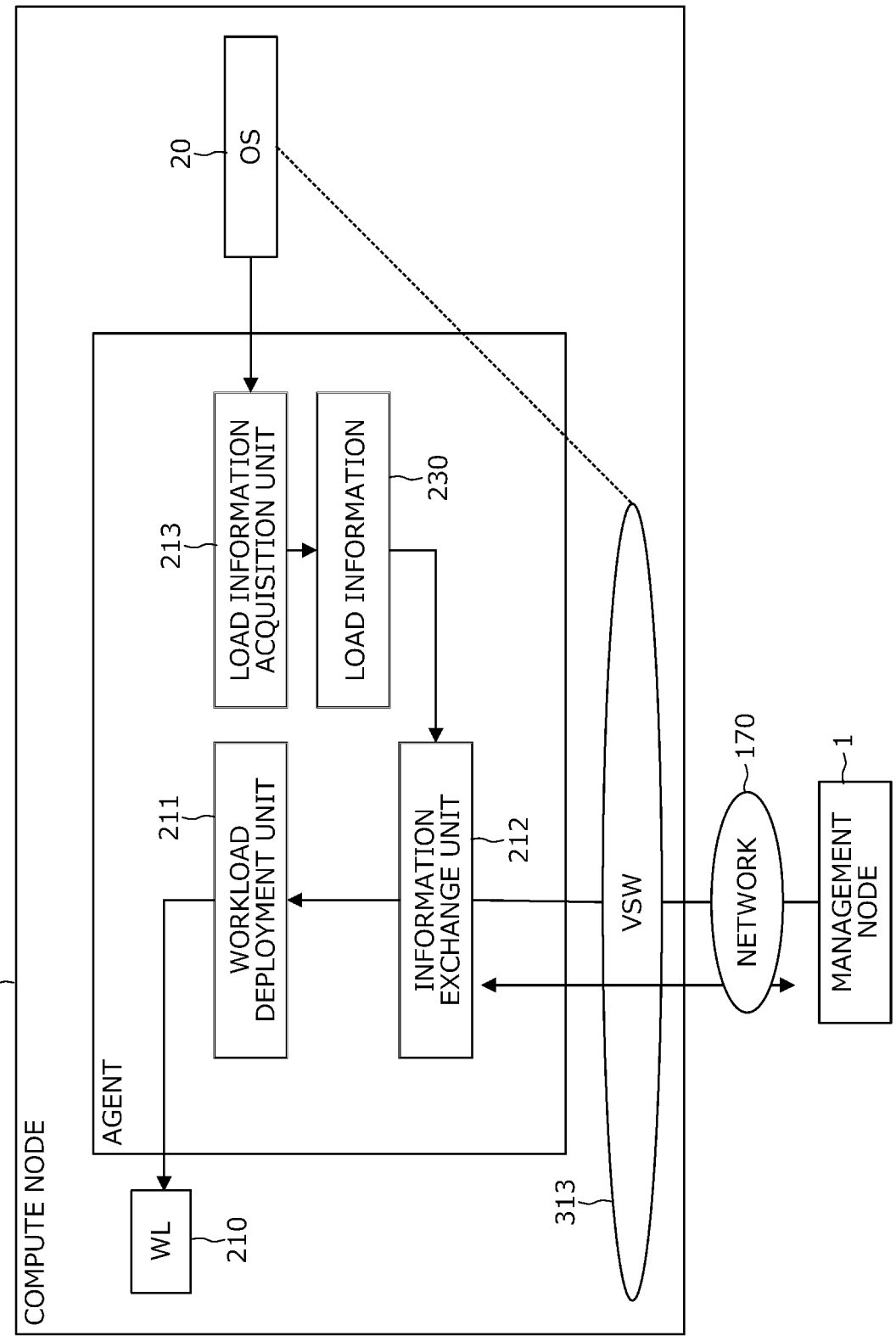
FIG. 7 is a block diagram schematically illustrating a software structure example of a compute node illustrated in FIG. 3.

FIG. 7 is a block diagram schematically illustrating a software structure example of the compute node 2 illustrated in FIG. 3.

The compute node 2 includes a workload deployment unit 211, an information exchange unit 212, and a load information acquisition unit 213 as an agent.

The load information acquisition unit 213 acquires load information 230 including the workload load information 131, the compute node load information 133, and the accelerator load information 134 illustrated in FIG. 6 from an OS 20.

The information exchange unit 212 transmits the load information 230 acquired by the load information acquisition unit 213 to the management node 1 via a virtual switch (VSW) 214 and the network 170.

The workload deployment unit 211 deploys the workload (WL) 210 based on the determination by the management node 1.

Figure 8:
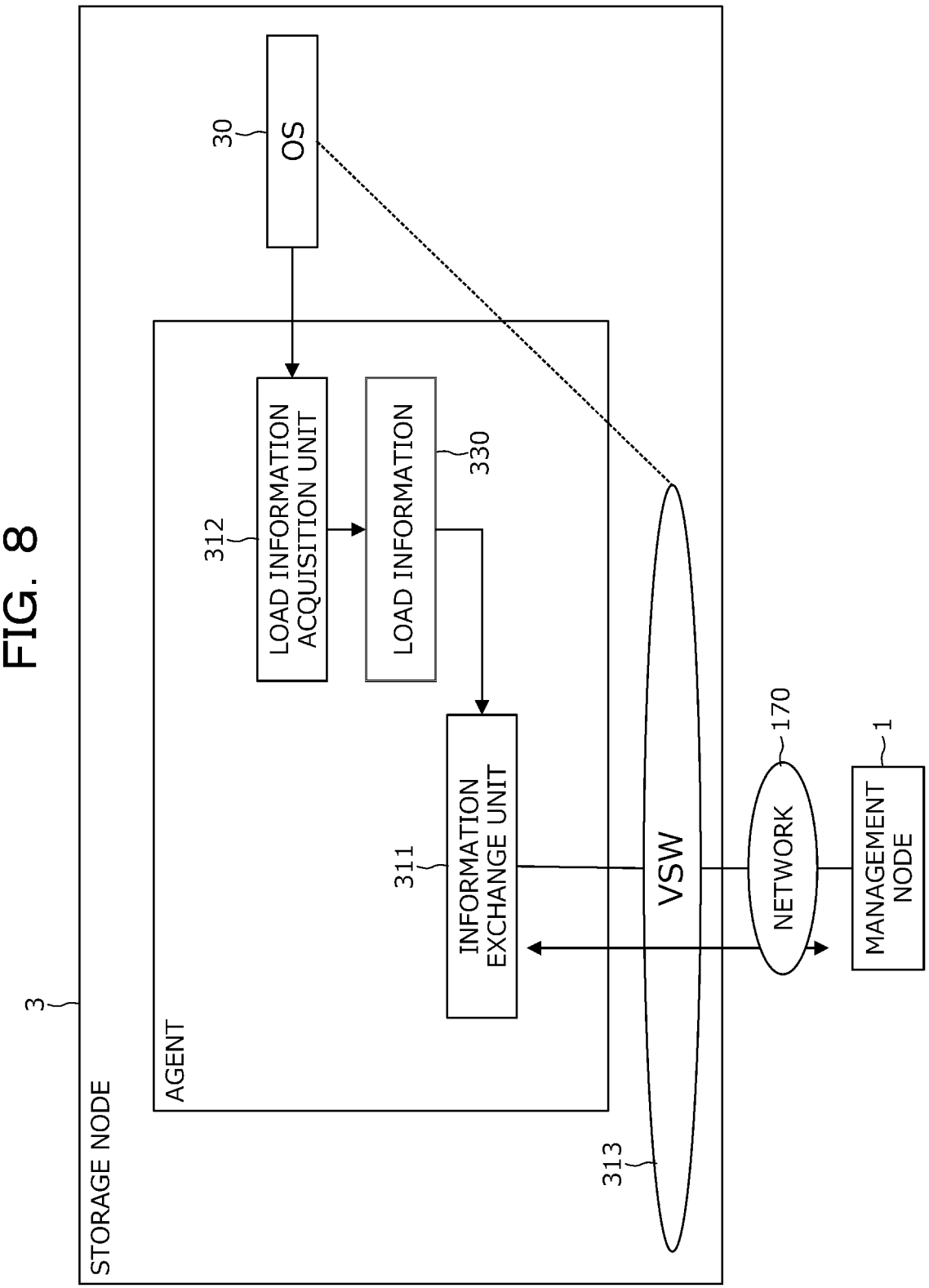
FIG. 8 is a block diagram schematically illustrating a software structure example of a storage node illustrated in FIG. 3.

FIG. 8 is a block diagram schematically illustrating a software structure example of the storage node 3 illustrated in FIG. 3.

The storage node 3 includes an information exchange unit 311 and a load information acquisition unit 312 as an agent.

The load information acquisition unit 312 acquires load information 330 including the storage node load information 135 illustrated in FIG. 6 from an OS 30.

The information exchange unit 311 transmits the load information 330 acquired by the load information acquisition unit 312 to the management node 1 via a VSW 313 and the network 170.

[A-2] Exemplary Operation

Figure 9:
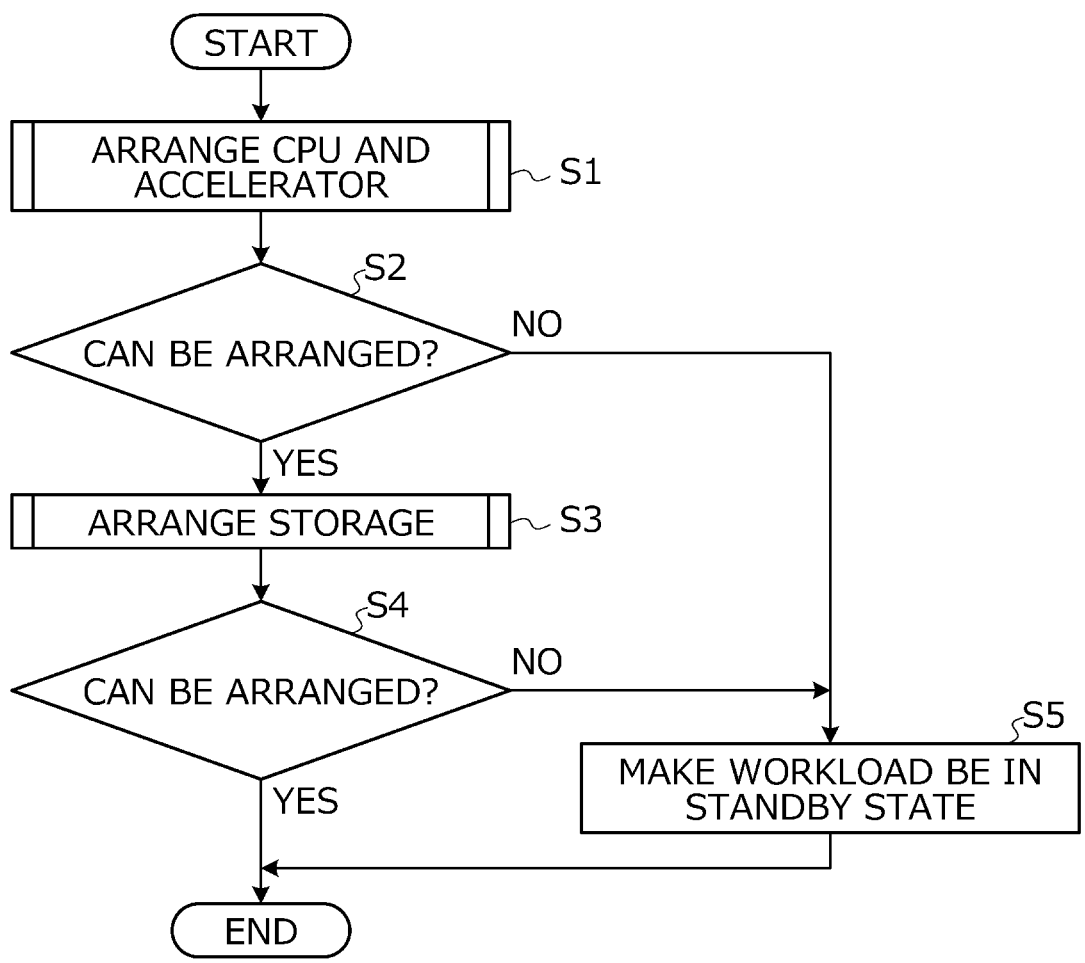
FIG. 9 is a flowchart for explaining replica position determination processing according to the embodiment.

The processing for determining the replica position according to the embodiment will be described with reference to the flowchart (steps S1 to S5) illustrated in FIG. 9.

The management node 1 arranges the CPU and the accelerator 220 (step S1). Note that details of the processing for arranging the CPU and the accelerator 220 will be described later with reference to FIG. 10.

The management node 1 determines whether or not the CPU and the accelerator 220 can be arranged (step S2).

When it is not possible to perform the arrangement (refer to NO route in step S2), the procedure proceeds to step S5.

On the other hand, when it is possible to perform the arrangement (refer to YES route in step S2), the management node 1 arranges the storage (step S3). Note that, the processing for arranging the storage will be described later with reference to FIG. 11.

The management node 1 determines whether or not the storage can be arranged (step S4).

When it is not possible to perform the arrangement (refer to NO route in step S4), the management node 1 makes the workload 210 be in a standby state (step S5). Then, the processing for determining the replica position ends.

On the other hand, when it is possible to perform the arrangement (refer to YES route in step S4), the processing for determining the replica position ends.

Figure 10:
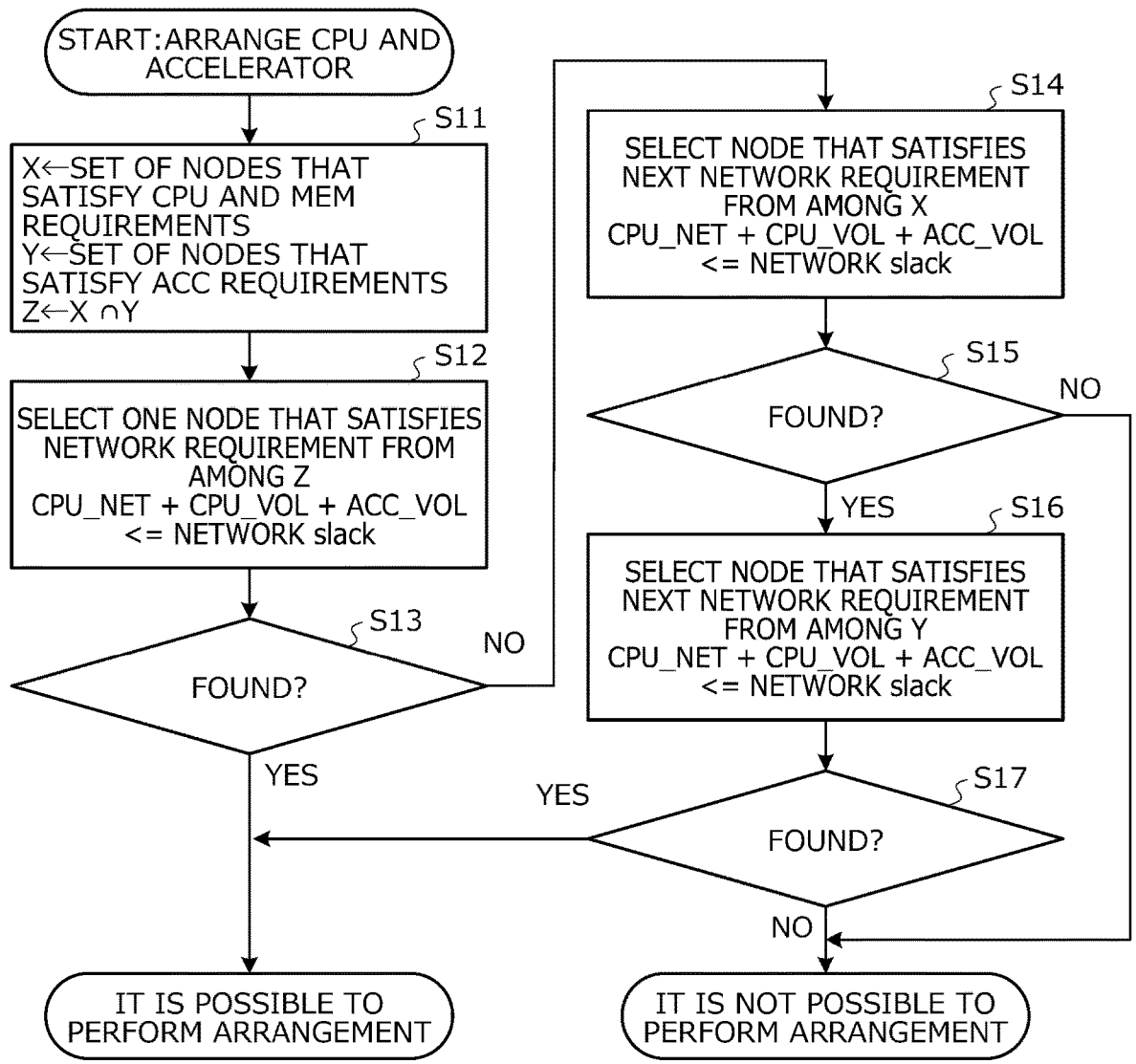
FIG. 10 is a flowchart for explaining details of processing for arranging a CPU and an accelerator illustrated in FIG. 9.

Next, the details of the processing for arranging the CPU and the accelerator 220 illustrated in FIG. 9 will be described with reference to the flowchart (steps S11 to S17) illustrated in FIG. 10.

The management node 1 sets a set of nodes that satisfy requirements of the CPU and the memory (MEM) as X, a set of nodes that satisfy requirements of the accelerator (ACC) 220 as Y, and a product set X n Y of X and Y as Z (step S11).

The management node 1 selects one node that satisfies a network requirement "CPU_NET+CPU_VOL+ACC_VOL<=network slack" from among the set Z (step S12). Note that, CPU_NET indicates a communication amount between the CPU and the network, CPU_VOL indicates a communication amount between the CPU and the volume, and ACC_VOL indicates a communication amount between the accelerator 220 and the volume. Furthermore, the network slack indicates a margin of a network amount of one node.

The management node 1 determines whether or not a node that satisfies the network requirement has been found (step S13).

When the node that satisfies the network requirement has been found (refer to YES route in step S13), it is considered that it is possible to perform the arrangement, and the processing for arranging the CPU and the accelerator 220 ends.

On the other hand, when the node that satisfies the network requirement has not been found (refer to NO route in step S13), the management node 1 selects one node that satisfies a network requirement "CPU_NET+CPU_VOL+CPU_ACC<=network slack" from among the set X (step S14). Note that CPU—NET indicates a communication amount between the CPU and the network, CPU_VOL indicates a communication amount between the CPU and the volume, and CPU_ACC indicates a communication amount between the CPU and the accelerator 220. Furthermore, the network slack indicates a margin of a network amount of one node.

The management node 1 determines whether or not a node that satisfies the network requirement has been found (step S15).

When the node that satisfies the network requirement has not been found (refer to NO route in step S15), it is considered that it is not possible to perform the arrangement, and the processing for arranging the CPU and the accelerator 220 ends.

On the other hand, when the node that satisfies the network requirement has been found (refer to YES route in step S15), the management node 1 selects one node that satisfies a network requirement "ACC_VOL+CPU_ACC<=network slack" from among the set Y (step S16). Note that, ACC_VOL indicates a communication amount between the accelerator 220 and the volume, and CPU_ACC indicates a communication amount between the CPU and the accelerator 220. Furthermore, the network slack indicates a margin of a network amount of one node.

The management node 1 determines whether or not a node that satisfies the network requirement has been found (step S17).

When the node that satisfies the network requirement has been found (refer to YES route in step S17), it is considered that it is possible to perform the arrangement, and the processing for arranging the CPU and the accelerator 220 ends.

On the other hand, when the node that satisfies the network requirement has not been found (refer to NO route in step S17), it is considered that it is not possible to perform the arrangement, and the processing for arranging the CPU and the accelerator 220 ends.

Next, the details of the processing for arranging the storage illustrated in FIG. 9 will be described with reference to the flowchart (steps S21 to S26) illustrated in FIG. 11.

The management node 1 sets a set of the storage nodes 3 each having the replica of the volume as V (step S21).

The management node 1 selects one node that satisfies a network requirement "CPU_VOL+ACC_VOL<=network slack" from among the set V (step S22). Note that, CPU_VOL indicates a communication amount between the CPU and the volume, and ACC_VOL indicates a communication amount between the accelerator 220 and the volume. Furthermore, the network slack indicates a margin of a network amount of one node.

The management node 1 determines where or not a node that satisfies the network requirement has been found (step S23).

When the node that satisfies the network requirement has been found (refer to YES route in step S23), it is considered that it is possible to perform the arrangement, and the processing for arranging the storage ends.

On the other hand, when the node that satisfies the network requirement has not been found (refer to NO route in step S23), the management node 1 selects a plurality of nodes that satisfies a network requirement "CPU_VOL+ACC_VOL<=network slack" in combination from among the set V (step S24). Note that, CPU_VOL indicates a communication amount between the CPU and the volume, and ACC_VOL indicates a communication amount between the accelerator 220 and the volume. Furthermore, the network slack indicates a margin of a network amount of one node.

The management node 1 arranges the volume in the selected node (step S25).

The management node 1 determines whether or not a node that satisfies the network requirement has been found (step S26).

When the node that satisfies the network requirement has been found (refer to YES route in step S26), it is considered that it is possible to perform the arrangement, and the processing for arranging the storage ends.

On the other hand, when the node that satisfies the network requirement has not been found (refer to NO route in step S26), it is considered that it is not possible to perform the arrangement, the processing for arranging the storage ends.

Figure 11:
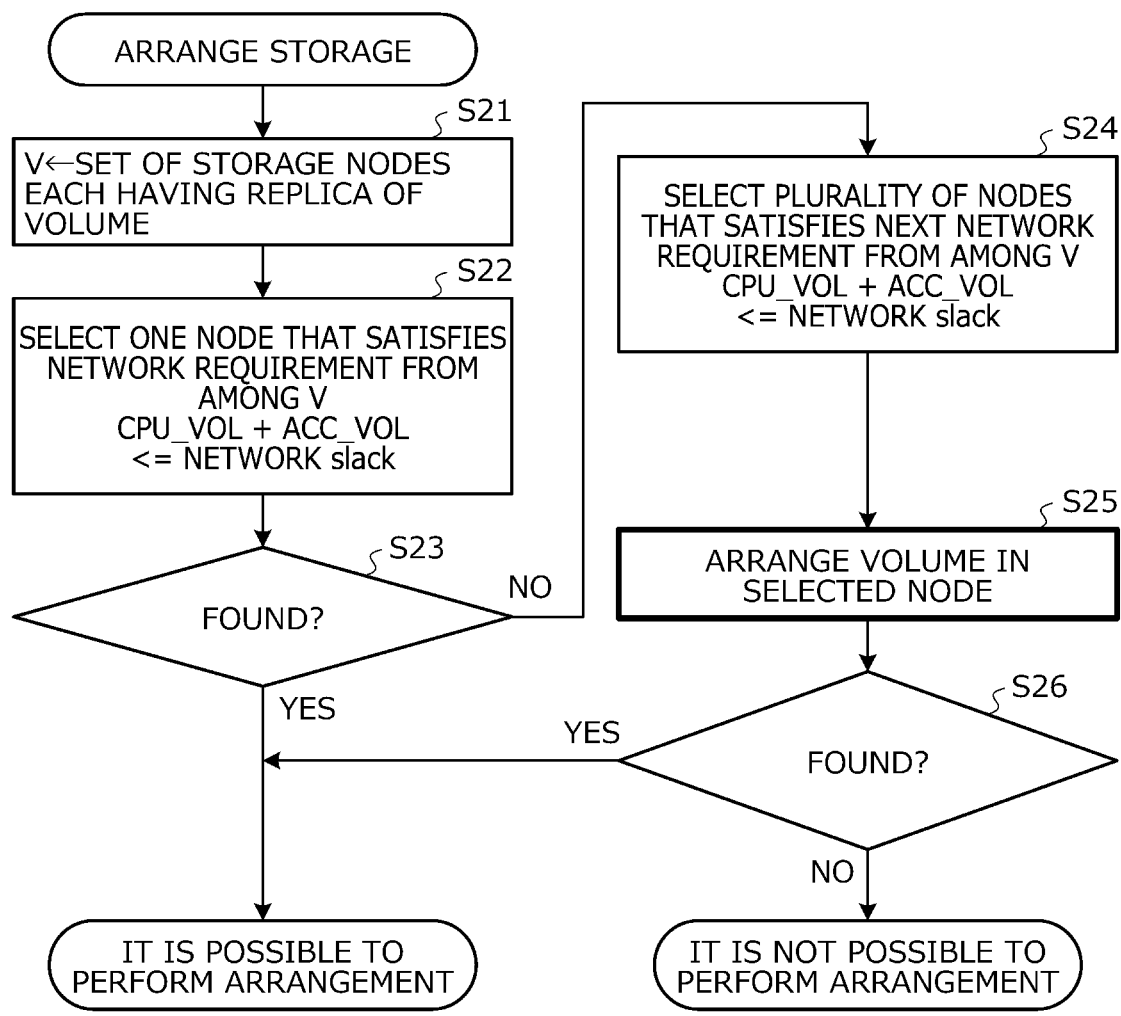
FIG. 11 is a flowchart for explaining details of processing for arranging a storage illustrated in FIG. 9.

FIG. 12 is a table for explaining a band target value in the processing for arranging the storage illustrated in FIG. 11.

It is assumed that there be three used volumes $V_1$, $V_2$, and $V_3$ and a replica is included in the storage node 3. In the example illustrated in FIG. 12, replicas of the volume $V_1$ are arranged in storage nodes #1 and #2, replicas of the volume $V_2$ are arranged in storage nodes #2 and #3, and replicas of the volume $V_3$ are arranged in storage nodes #1 and #3. Furthermore, loads of the respective volumes $V_1$, $V_2$, and $V_3$ are set as $R_1$, $R_2$, and $R_3$, respectively.

Network slacks of the respective storage nodes 3 are set as $S_1$, $S_2$, and $S_3$.

The storages are allocated according to a procedure including the following procedures (1) to (4).

(1) $R_{11}$ and $R_{31}$ are allocated as much as possible within a range that does not exceed $S_1$. At this time, priority is given to $R_{11}$. Note that, $R_{11}=\min(S_1, R_1)$ and $R_{31}=\min(S_1-R_{11}, R_3)$.

$$R_{11}+R_{31} \le S_1, R_{11} \le R_1, R_{31} \le R_3$$

(2) $R_{12}$ and $R_{22}$ are allocated as much as possible within a range that does not exceed $S_2$. At this time, priority is given to $R_{12}$.

$$R_{12}+R_{21} \le R_2, R_{12}=R_1-R_{11}, R_{22} \le R_2$$

(3) $R_{23}$ and $R_{33}$ are allocated within a range that does not exceed $S_3$.

$$R_{23}+R_{33} \le S_3, R_{23}=R_2-R_{22}, R_{33}=R_3-R_{31}$$

(4) When (1) to (3) described above are not satisfied, it is not possible to perform allocation.

Then, access to the volume is controlled so as to satisfy the band target value. In a case where the volume of the storage node 3 includes N blocks, an access band R to each block is distributed to $R_1$ and $R_2$ ($R=R_1+R_2$).

When the workload 210 is deployed, the number of blocks corresponding to two nodes of the replicas of the volume is divided into N1 and N2 as follows.

$$N_1 = \frac{R_1}{R}N, N_2 = \frac{R_2}{R}N \qquad \text{[Expression 1]}$$

Furthermore, at the time when the workload 210 is executed, an execution node of the workload 210 that accesses the volume limits an access band to the volume to R. In a status where accesses to the respective blocks are uniformly performed, access bands to the respective replicas are $R_1$ and $R_2$.

Figure 13:
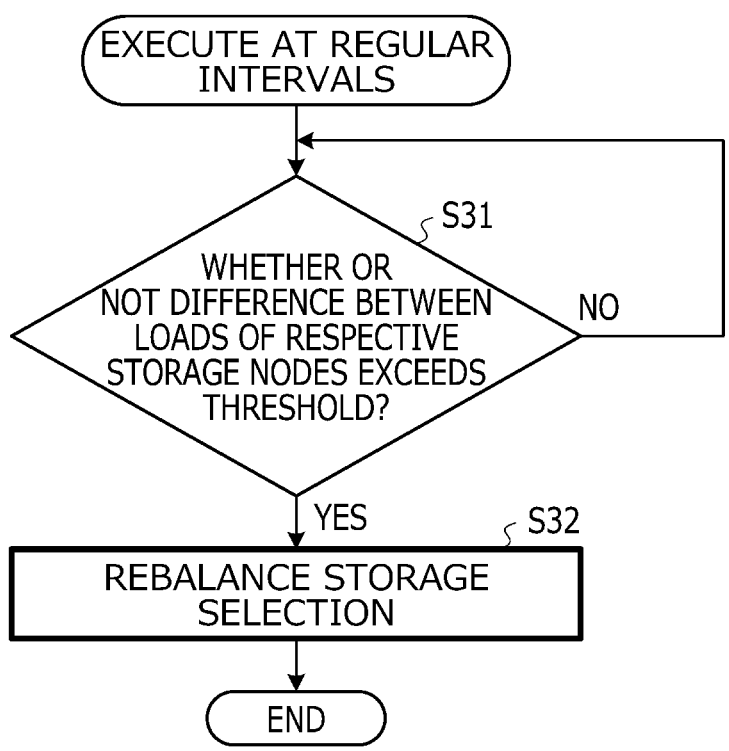
FIG. 13 is a flowchart for explaining storage node rebalance processing according to the embodiment.

Next, processing for rebalancing the storage nodes 3 in the embodiment will be described with reference to the flowchart (steps S31 and S32) illustrated in FIG. 13.

The management node 1 determines whether or not a difference between the loads of the respective storage nodes 3 exceeds a threshold at regular intervals (step S31).

When the difference between the loads of the respective storage nodes 3 does not exceed the threshold (refer to NO route in step S31), the processing in step S31 is repeatedly executed.

On the other hand, when the difference between the loads of the respective storage nodes 3 exceeds the threshold (refer to YES route in step S31), the management node 1 rebalances the selection of the storage nodes 3 (step S32). As a result, it is possible to prevent increase of a load on a specific storage node 3 and deterioration in performance, and resources can be equally allocated to workloads by reducing the difference between the loads. Then, the processing for rebalancing the storage nodes 3 ends.

According to the following equation, an average, a difference d, and a variance D of the network slack are obtained, and when the variance D exceeds a threshold t, rebalancing is performed.

$$d_i = s_i - \bar{s}, D = \sum_{i=1}^{n} d_i^2 \qquad \text{[Expression 2]}$$

(NETWORK SLACKS OF STORAGE NODES #1, #2, . . ., #n: $s_1, s_2, \ldots, s_n$. AVERAGE OF NETWORK SLACK: $\bar{s}$)

Then, rebalancing is performed according to the following procedures (1) to (4).

(1) The following sets G and L are defined.

$$G=\{\text{STORAGE NODE}_i|s_i \ge \bar{s}+t\}, L=\{\text{STORAGE NODE}_i|s_i \le \bar{s}-t\} \qquad \text{[Expression 3]}$$

(2) A set V of volumes of which replicas belong to both of the sets G and L is extracted.

(3) One volume is select from among the set V, and load allocation is moved from the set G to the set L.

(4) Repeat until a difference between the bands of the volumes belonging to the sets G and L becomes equal to or less than a certain value or there is no candidate volume to be moved.

[B] Effects

According to the management node 1, the storage system 100, and the information processing method in the example of the embodiment described above, for example, the following effects can be obtained.

When executing the container, the management node 1 acquires the workload load information 131 and system load information (in other words, compute node load information 133, accelerator load information 134, and storage node load information 135). When the workload 210 is activated, the management node 1 determines the arrangement destination of the workload 210 and the replica position of the volume on the basis of the workload load information 131 and the system load information.

As a result, it is possible to distribute the loads in the storage system 100 and improve the throughput. Specifically, for example, it is possible to effectively utilize the resources of the cluster including the communication and the storages. Therefore, more applications can be executed with the same system.

The management node 1 selects the first compute node 2 of which the sum of the communication amount between the processor 11 and the network 170, the communication amount between the processor 11 and the volume, and the communication amount between the accelerator 220 and the volume is equal to or less than the margin in the network 170 from among the plurality of compute nodes 2. Furthermore, the management node 1 selects the second compute node 2 of which the sum of the communication amount between the processor 11 and the network 170, the communication amount between the processor 11 and the volume, and the communication amount between the processor 11 and the accelerator 220 is equal to or less than the margin in the network 170 from among the plurality of compute nodes 2. The management node 1 determines the first compute node 2 or the second compute node 2 as the arrangement destination of the workload 210.

As a result, an appropriate compute node 2 can be selected as the arrangement destination of the workload 210.

The management node 1 selects one or more first storage nodes 3 of which the sum of the communication amount between the processor 11 and the volume and the communication amount between the accelerator 220 and the volume is equal to or less than the margin in the network 170 from among the plurality of storage nodes 3. The management node 1 determines the one or more first storage nodes 3 as the replica positions.

As a result, an appropriate storage node 3 can be selected as the replica position of the volume.

When a difference between the loads of the plurality of storage nodes 3 included in the storage system 100 exceeds the threshold, the management node 1 determines the replica position.

As a result, it is possible to prevent increase of a load on a specific storage node 3 and deterioration in performance, and resources can be equally allocated to workloads by reducing the difference between the loads.

[C] Others

The disclosed technique is not limited to the embodiment described above, and various modifications may be made without departing from the spirit of the present embodiment. Each configuration and each processing according to the present embodiment may be selected as needed, or may also be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claims:

1. A management device of a storage system, the management devices comprising:
    a memory; and
    a first processor coupled to the memory and configured to:
    acquire workload load information and system load information when executing a container,
    determine a workload arrangement destination based on the workload load information and the system load information when activating a workload, and
    determine a replica position of a volume based on the workload load information and the system load information when activating a workload,
    wherein
    the storage system includes a plurality of server devices and a plurality of storage devices connected to each other via a network,
    each of the plurality of server devices includes a second processor and an accelerator, and
    each of the plurality of storage devices includes a volume, wherein
    the first processor is further configured to:
    select, from among the plurality of server devices, a first server device of which a sum of a communication amount between the second processor and the network, a communication amount between the second processor and the volume, and a communication amount between the accelerator and the volume is equal to or less than a margin in the network,
    select, from among the plurality of server devices, a second server device of which a sum of a communication amount between the second processor and the network, a communication amount between the second processor and the volume, and a communication amount between the second processor and the accelerator is equal to or less than a margin in the network, and
    determine the first server device or the second server device as the workload arrangement destination.

2. The management device according to claim 1, wherein the first processor is further configured to:
    select, from among the plurality of server devices, one or more first storage devices of which a sum of a communication amount between the processor and the volume and a communication amount between the accelerator and the volume is equal to or less than a margin in the network are selected from among the plurality of storage devices, and
    determine the one or more first storage devices as the replica positions.

3. The management device according to claim 1, wherein the first processor is further configured to determine the replica position when a difference between loads of a plurality of storage devices including the storage device exceeds a threshold, and
    wherein the plurality of storage devices being included in the storage system.

4. A storage system comprising:
    a management device;
    a server device configured to transmit first system load information to the management device; and
    a storage device configured to transmit second system load information to the management device, wherein
    the management device includes:
    a first processor configured to acquire workload load information, the first system load information, and the second system load information when executing a container, and determine a workload arrangement destination based on the workload load information, the first system load information, and the second system load information when activating a workload, and
    determine a replica position of a volume based on the workload load information and the second system load information when activating a workload,
    further comprising:
    a plurality of server devices, the plurality of server device including the server device; and
    a plurality of storage devices, the plurality of storage devices including the storage device, wherein
    the server device connects to the storage device, each of the plurality of server devices includes a second processor and an accelerator, and
each of the plurality of storage devices includes a volume, wherein
the first processor is further configured to:
select, from among the plurality of server devices, a first server device of which a sum of a communication amount between the second processor and a network, a communication amount between the second processor and the volume, and a communication amount between the accelerator and the volume is equal to or less than a margin in the network,
select, from among the plurality of server devices, a second server device of which a sum of a communication amount between the second processor and the network, a communication amount between the second processor and the volume, and a communication amount between the second processor and the accelerator is equal to or less than a margin in the network, and
determine the first server device or the second server device as the workload arrangement destination.

5. The storage system according to claim 4,
the first processor is further configured to:
select, from among the plurality of server devices, one or more first storage devices of which a sum of a communication amount between the second processor and the volume and a communication amount between the accelerator and the volume is equal to or less than a margin in a network are selected from among the plurality of storage devices, and
determine the one or more first storage devices as the replica positions.

6. The storage system according to claim 4, wherein the first processor is further configured to determine the replica position when a difference between loads of a plurality of storage devices including the storage device exceeds a threshold.

7. An information processing method in a storage system including a management device, server device, and storage device, the information processing method comprising:
transmitting, by the server device, first system load information to the management device;
transmitting, by the storage device, second system load information to the management device,
acquiring, by the management device, workload load information and system load information when executing a container, and
determining, by the storage device, a workload arrangement destination based on the workload load information and the system load information when activating a workload, and
determine a replica position of a volume based on the workload load information and the system load information when activating a workload,
wherein
the storage system includes a plurality of server devices and a plurality of storage devices connected to each other via a network,
each of the plurality of server devices includes a second processor and an accelerator, and
each of the plurality of storage devices includes a volume, wherein
the information processing method further comprising:
selecting, from among the plurality of server devices, a first server device of which a sum of a communication amount between the second processor and the network, a communication amount between the second processor and the volume, and a communication amount between the accelerator and the volume is equal to or less than a margin in the network,
selecting, from among the plurality of server devices, a second server device of which a sum of a communication amount between the second processor and the network, a communication amount between the second processor and the volume, and a communication amount between the second processor and the accelerator is equal to or less than a margin in the network, and
determining the first server device or the second server device as the workload arrangement destination.

8. The information processing method according to claim 7,
the information processing method further comprising:
selecting, from among the plurality of server devices, one or more first storage devices of which a sum of a communication amount between the processor and the volume and a communication amount between the accelerator and the volume is equal to or less than a margin in the network are selected from among the plurality of storage devices, and
determining the one or more first storage devices as the replica positions.

9. The information processing method according to claim 7, further comprising:
determining the replica position when a difference between loads of a plurality of storage devices including the storage device exceeds a threshold and
wherein the plurality of storage devices being included in the storage system.

* * * * *